US010372375B2

(12) United States Patent
Iwashiro

(10) Patent No.: US 10,372,375 B2
(45) Date of Patent: Aug. 6, 2019

(54) MAGNETIC DISK DEVICE AND COMMAND REORDERING METHOD THEREOF

(71) Applicant: KABUSHIKI KAISHA TOSHIBA, Tokyo (JP)

(72) Inventor: Masafumi Iwashiro, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

(21) Appl. No.: 15/445,846

(22) Filed: Feb. 28, 2017

(65) Prior Publication Data

US 2018/0046410 A1 Feb. 15, 2018

(30) Foreign Application Priority Data

Aug. 9, 2016 (JP) ................................ 2016-156429

(51) Int. Cl.

*G06F 12/12* (2016.01)
*G06F 3/06* (2006.01)
*G11B 5/55* (2006.01)

(52) U.S. Cl.

CPC .......... *G06F 3/0659* (2013.01); *G06F 3/0611* (2013.01); *G06F 3/0656* (2013.01); *G06F 3/0676* (2013.01); *G11B 5/5547* (2013.01)

(58) Field of Classification Search

CPC ............................ G06F 3/0659; G11B 5/5547
USPC ........................................................ 711/112
See application file for complete search history.

(56) References Cited

U.S. PATENT DOCUMENTS

| | | | |
|---|---|---|---|
| 6,342,985 B1 | 1/2002 | Clare et al. | |
| 7,061,714 B1 | 6/2006 | Yu | |
| 7,369,352 B2 | 5/2008 | Chu et al. | |
| 2006/0268449 A1* | 11/2006 | Chu .................... | G11B 5/5547 360/78.06 |

OTHER PUBLICATIONS

Chinese Office Action dated Jan. 22, 2019 in related Chinese Patent Application 201710119211.0 with English Translation.

* cited by examiner

*Primary Examiner* — Jae U Yu
(74) *Attorney, Agent, or Firm* — Kim & Stewart LLP

(57) ABSTRACT

A magnetic disk device includes a magnetic disk, a magnetic head, a voice coil motor which drives movement of the magnetic head relative to the magnetic disk, a drive circuit which drives the voice coil motor, a memory in which a seek time for a seek operation is stored in association with a seek distance of the magnetic head, and a controller. The controller changes the seek time stored in the memory in association with the seek distance based on a temperature and a power supply voltage of the drive circuit.

16 Claims, 10 Drawing Sheets

| SEEK DISTANCE | SEEK TIME |
|---|---|
| D1 | T1 |
| D2 | T2 |
| D3 | T3 |
| ⋮ | ⋮ |
| DM | TM |

Q

| WRITE COMMAND | WRITE POSITION | ORDER |
|---|---|---|
| WA | PA | 1 |
| WB | PB | 2 |
| WC | PC | 3 |
| WD | PD | 4 |

Q

| WRITE COMMAND | WRITE POSITION | ORDER |
|---|---|---|
| WA | PA | 1 |
| WB | PB | 3 |
| WC | PC | 2 |
| WD | PD | 4 |

MAGNETIC DISK DEVICE AND COMMAND REORDERING METHOD THEREOF

CROSS-REFERENCE TO RELATED APPLICATION

This application is based upon and claims the benefit of priority from. Japanese Patent Application No. 2016-156429, filed Aug. 9, 2016, the entire contents of which are incorporated herein by reference.

FIELD

Embodiments described herein relate generally to a magnetic disk device and a command reordering method thereof.

BACKGROUND

In an effort to reduce latency in a writing operation, a magnetic disk device may reorder write commands.

DESCRIPTION OF THE DRAWINGS

FIG. 3 is a view illustrating an exemplary configuration of a seek table of the magnetic disk device according to one embodiment.

DETAILED DESCRIPTION

In general, a magnetic disk device and a command reordering method thereof according to embodiments improve the efficiency of a write operation.

According to one embodiment, there is provided a magnetic disk device includes a magnetic disk, a magnetic head, a voice coil motor which drives movement of the magnetic head relative to the magnetic disk, a drive circuit which drives the voice coil motor, a memory in which a seek time for a seek operation is stored in association with a seek distance of the magnetic head, and a controller. The controller changes the seek time stored in the memory in association with the seek distance based on a temperature and a power supply voltage of the drive circuit.

Hereinafter, a magnetic disk device and a command reordering method thereof according to embodiments are described in detail with reference to the accompanying drawings. However, the present disclosure is not limited to the embodiments.

Figure 1:
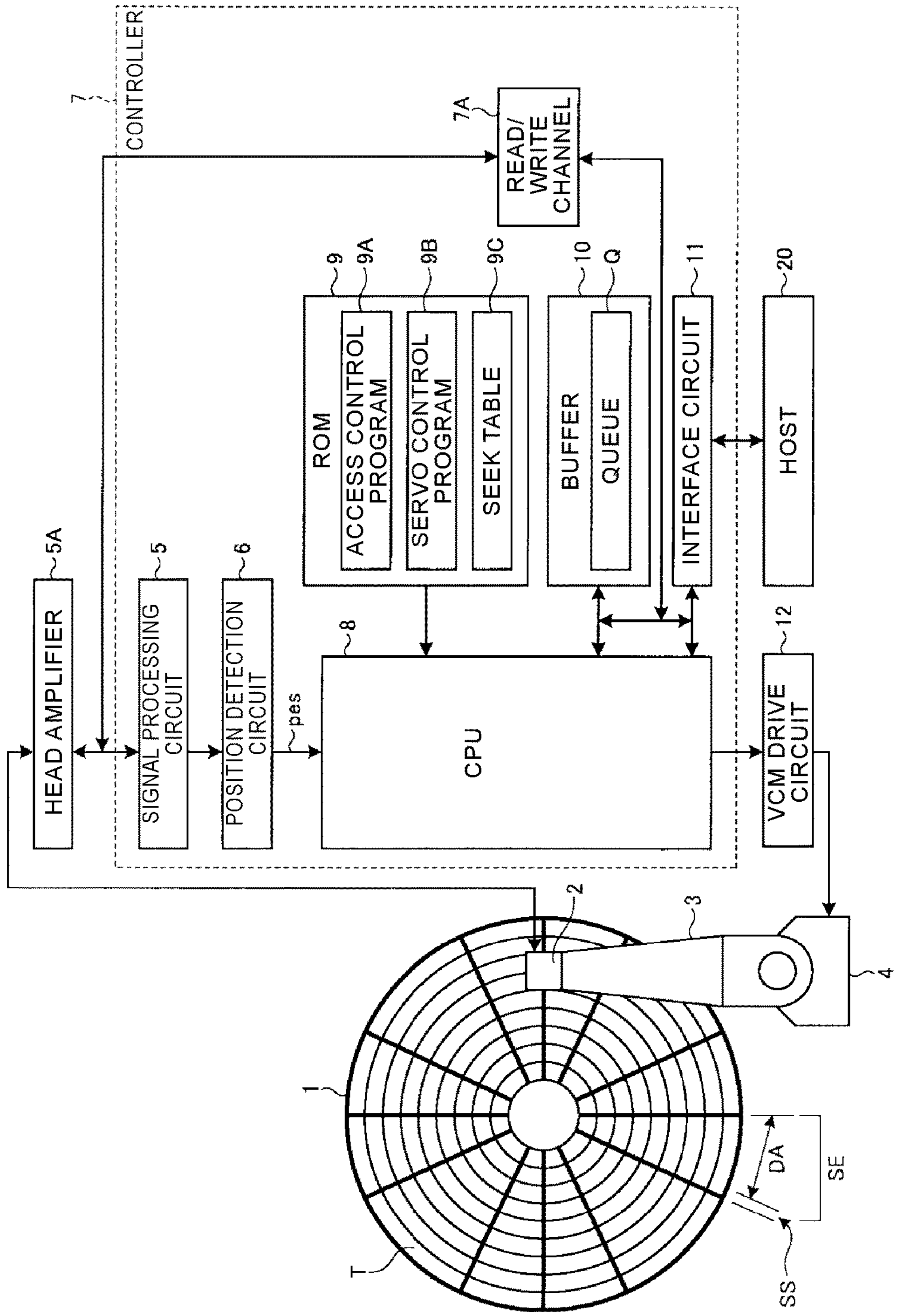
FIG. 1 is a block diagram schematically illustrating a configuration of a magnetic disk device according to an embodiment.

FIG. 1 is a block diagram schematically illustrating a configuration of a magnetic disk device according to one embodiment.

In FIG. 1, a magnetic disk device includes a magnetic disk 1 and a magnetic head 2. The magnetic head 2 includes a write head (not illustrated) and a read head (not illustrated) which are supported by a head slider. The magnetic head 2 is held over the magnetic disk 1 through an arm 3. The arm 3 moves the magnetic head 2 in a substantially radial direction of the recording surface of the magnetic disk 1 at the time of seeking or the like.

The magnetic disk 1 has a plurality of tracks T formed along the circumferential direction. Each track T has data areas DA in which user data are written and servo areas SS in which servo data are written. The servo areas SS are substantially radially arranged on the recording surface of the magnetic disk 1 and the data areas DA are interposed between the servo areas SS in the circumferential direction. A servo sector SE is implemented with the servo areas SS and the data areas DA consecutively formed in the circumferential direction. The information regarding sector and cylinder is recorded in each servo area SS. The sector and cylinder information may give servo addresses (also called address information) in the circumferential and radial directions of the magnetic disk 1. As for the servo addresses in the circumferential direction, values from 0 to M−1 may be sequentially assigned to M equally-divided sectors SE. As servo addresses in the radial direction, values from 0 to X−1 may be sequentially assigned to tracks T of X lines.

In addition, the magnetic disk device includes a voice coil motor 4 which drives the magnetic head 2 through the arm 3, and a VCM drive circuit 12 which drives the voice coil motor 4. In addition, the magnetic disk device includes a controller 7 and a head amplifier 5A. The head amplifier 5A outputs a write current to be supplied to the magnetic head 2 or amplifies a reproduction signal read by the magnetic head 2. The controller 7 controls a position of the magnetic head 2 based on position error information (pes) and also performs reordering of write commands and read commands which are held in a queue Q.

The controller 7 includes a signal processing circuit 5, a position detection circuit 6, a read/write channel 7A, a CPU 8 (an example of a processor), a ROM 9, a buffer 10, and an interface circuit 11. The signal processing circuit 5 converts servo data read by the magnetic head 2 into a data format to be handled by the CPU 8. Based on the servo data read by the magnetic head 2, the position detection circuit 6 generates the position error information (pes) according to a positioning error of the magnetic head 2 in the radial direction. The read/write channel 7A converts a signal reproduced by the magnetic head 2 (the read head) into a data format to be handled by a host 20 or converts data output from the host 20 into a signal format to be recorded by the magnetic head 2 (the write head). Such format conversion includes a DA conversion, coding, AD conversion, and decoding. In addition, the read/write channel 7A decodes the signal reproduced by the read head or encodes the data output from the host 20. The programs or the like which operate the CPU 8 may be stored in the ROM 9. For example, an access control program 9A, a servo control program 9B, and a seek table 9C may be stored in the ROM 9. In addition, a rewritable nonvolatile memory may be included apart from the ROM 9 and, for example, the seek table 9C may be stored in this nonvolatile memory. This nonvolatile memory and the ROM 9 may be installed outside the controller 7.

The access control program 9A causes the CPU 8 to execute the reordering of the write commands held in the queue Q and the reordering of the read commands held in the queue Q. The servo control program 9B causes the CPU 8 to execute a servo control at the time of data write in the magnetic disk 1 or at the time of data read from the magnetic disk 1. The seek table 9C describes a relationship between a seek distance and a seek time of the magnetic head 2. The seek distance refers to a movement distance from the current cylinder position of the magnetic head 2 to a target cylinder position designated by a command from the host 20. The seek time refers to a time taken for the magnetic head 2 to move from the current cylinder position to the target cylinder position designated by the command. The buffer 10 provides a work area which temporarily stores data required for the operation of the CPU 8. The buffer 10 may hold the write command and the read command sent from the host 20 in the queue Q. The buffer 10 uses, for example, a randomly accessible SDRAM or SRAM.

The interface circuit 11 transfers data, commands and the like between the controller 7 and the host 20. For example, the interface circuit 11 converts data sent from the controller 7 into a data format which may be handled by the host 20, or converts data sent from the host 20 into a data format which may be handled by the controller 7.

The host 20 may be a personal computer or an associated peripheral circuit which issues the write command, the read command or the like to the magnetic disk device, or may be a network device which is accessible to a server or the like. That is, the magnetic disk device is used as an external memory device of the host 20. The magnetic disk device may be externally attached to the host 20 or may be incorporated in the host 20.

Hereinafter, an example of the write operation of the magnetic disk device is described.

When the write command is sent from the host 20, the write command is held in the queue Q. In the write command, a write position of write data may be designated. Then, the CPU 8 calculates a seek distance based on the current position of the magnetic head 2 and the write position designated in the write command. Then, the CPU 8 acquires a seek time corresponding to the calculated seek distance with reference to the seek table 9C and corrects the seek time based on a temperature and a power supply voltage of the VCM drive circuit 12.

Then, the CPU 8 reorders the write command held in the queue Q based on the corrected seek time. Then, the CPU 8 executes the write command according to an execution order of the reordered write command.

At this time, servo data read from the rotating magnetic disk 1 through the magnetic head 2 is processed by the signal processing circuit 5. Next, the position detection circuit 6 calculates a demodulation position of the magnetic head 2 based on a result of the read of the servo data by the magnetic head 2 and generates position error information (pes) according to a position error of the magnetic head 2 (that is, a difference between the calculated demodulation position and a positioning target position of the magnetic head 2). In calculation of this position error information (pes), the current servo address (address information) of the magnetic head 2 is calculated from the sector and cylinder information recorded in the magnetic disk 1. Then, the position error information (pes) is calculated from the current address information, demodulation position, and target position of the magnetic head 2. Then, when the position error information (pes) calculated at a certain time interval is input to the controller 7, the controller 7 constructs a sample value control system which determines input information to the VCM drive circuit 12. At this time, the controller 7 controls the VCM drive circuit 12 such that the position error information (pes) is close to 0. Then, when the magnetic head 2 is at the write position designated by the write command, the write data is written in the write position.

Figure 2:
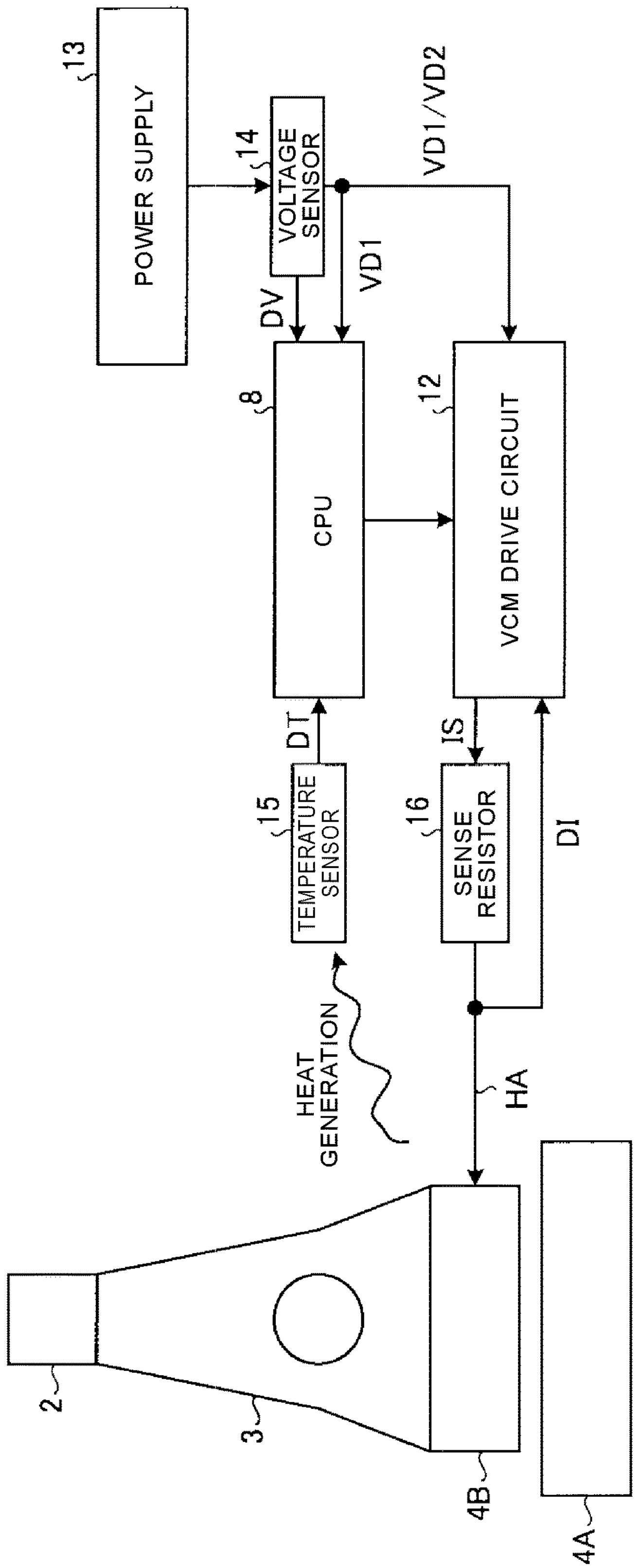
FIG. 2 is a block diagram schematically illustrating an exemplary configuration of a voice coil motor (VCM) current control system of the magnetic disk device according to an embodiment.

FIG. 2 is a block diagram schematically illustrating a configuration of a VCM current control system of the magnetic disk device according to one embodiment.

In FIG. 2, the magnetic disk device includes a power supply 13, a voltage sensor 14, a temperature sensor 15, and a sense resistor 16, in addition to the configuration of FIG. 1. The voice coil motor 4 includes a magnet 4A and a coil 4B. The power supply 13 supplies a power supply voltage VD1 to the CPU 8 and supplies power source voltages VD1 and VD2 to the VCM drive circuit 12. The power supply voltage VD2 is higher than the power supply voltage VD1. At this time, for example, the power supply voltage VD1 may be set to 5V, and the power supply voltage VD2 may be set to 12V. In the VCM drive circuit 12, the power supply voltage VD1 may be used for a digital circuit, and the power supply voltage VD2 may be used for an analog circuit. At this time, the power supply voltage VD2 may be used for a seek operation of the magnetic head 2. The voltage sensor 14 detects the power supply voltages VD1 and VD2 supplied from the power supply 13. The temperature sensor 15 detects a temperature of the voice coil motor 4. The temperature sensor 15 may be directly attached to the voice coil motor 4 or may be attached on a housing in which the voice coil motor 4 is installed (a housing in the vicinity of the VCM) or on a board outside the housing corresponding to the installation place of the VCM. The temperature sensor 15 detects the increase in temperature due to heat generated in the coil 4B when a seek current IS flows into the coil 4B. The sense resistor 16 detects the seek current IS supplied from the VCM drive circuit 12 to the voice coil motor 4. The VCM drive circuit 12 and the coil 4B are interconnected via a wiring HA. The sense resistor 16 is connected in series to the wiring HA.

A value of the seek current IS is set in the CPU 8 according to the current speed of the magnetic head 2 and a remaining distance to the write position. The seek current IS may be increased according to the seek distance. At this time, the CPU 8 may determine the seek current IS by function calculation. However, the seek current IS has its maximum value and, when the seek current IS reaches the maximum value, the seek current IS is kept constant even when the seek distance is increased. Then, when the power supply voltages VD1 and VD2 are supplied to the VCM drive circuit 12, the seek current IS corresponding to the value set in the CPU 8 is generated. This seek current IS is supplied from the VCM drive circuit 12 to the coil 4B via the wiring HA. When the seek current IS flows into the coil 4B, the magnetic head 2 is sought.

In addition, the seek current IS is detected by the sense resistor 16, and its detection value DI is input to the VCM drive circuit 12. The VCM drive circuit 12 monitors the seek current IS based on the detection value DI and performs a feedback control such that the seek current IS reaches a target value. In addition, the temperature of the voice coil motor 4 is detected by the temperature sensor 15, and its detection value DT is input to the CPU 8. The power supply voltages VD1 and VD2 supplied from the power supply 13 are detected by the voltage sensor 14, and their detection values DV are input to the CPU 8.

The CPU 8 acquires the seek time corresponding to the seek distance with reference to the seek table 9C and corrects the seek time based on the detection value DT of the temperature sensor 15 and the detection value DV of the voltage sensor 14. The detection value DV of the power supply voltage VD2 used for the seek operation is used to correct the seek time. The CPU 8 reorders the write command held in the queue Q based on the corrected seek time. Then, the CPU 8 executes the write command according to an execution order of the reordered write command. At this time, it is possible to calculate the seek distance every write command and calculate a value of the seek current IS according to the seek distance.

Assuming that a detection value of the temperature sensor 15 is DT, a temperature-corrected magnetic force of the voice coil motor 4 is J1, a reference magnetic force is J2, a magnetic reference temperature is TM, a magnetic temperature coefficient is JK, a temperature-corrected coil resistance of the voice coil motor 4 is R1, a coil reference resistance is R2, a coil reference temperature is TC, a coil temperature coefficient is CK, a voltage required for the seek operation is VS, the maximum current required for the seek operation used for correction of the seek time is IH, a resistance of the sense resistor 16 is RS, an on resistance of the VCM drive circuit 12 is RN, a resistance of the wiring HA is RH, a voltage margin is VM, a seek time is TS, and a seek time correction value is TH, the following relationships may be satisfied.

$$J1=JK*(DT-TM)+J2 \quad (1)$$

$$R1=CK*(DT-TC)+R2 \quad (2)$$

$$VS=J1/J2*IH*(R1+RS+RN+RH)*VM \quad (3)$$

$$TH=TS*(\mathrm{sqrt}(VS/VD2)-1) \quad (4)$$

Where, the "sqrt" represents an operation for determining a square root.

At this time, a corrected seek time TSH may be given according to the following equation.

$$TSH=TH+TS \quad (5)$$

According to the equation (5), when the temperature of the voice coil motor 4 rises, the corrected seek time TSH increases. When the power supply voltage VD2 of the VCM drive circuit 12 decreases, the corrected seek time TSH increases. In addition, for example, the magnetic reference temperature and the coil reference temperature may be set to 30° C. The maximum current IH required for the seek operation may be changed depending on the seek distance. At this time, separately from the seek table 9C, a table in which a relationship between the seek distance and the maximum current IH required for the seek operation is described may be provided.

The maximum current IH required for the seek operation may have a fixed value. At this time, the maximum current IH required for the seek operation is the maximum value of the seek current IS. When the maximum current IH required for the seek operation has the fixed value, the table in which the relationship between the seek distance and the maximum current IH required for the seek operation is described may be unnecessary.

FIG. 3 is a view illustrating an exemplary configuration of the seek table of the magnetic disk device according to one embodiment.

In FIG. 3, a relationship between seek distances D1 to DM (M is an integer of two or more) and seek times T1 to TM of the magnetic head 2 is described in the seek table 9C. The seek times T1 to TM registered in the seek table 9C may be set to values of the reference temperature and the reference power supply voltage. For example, the reference temperature may be set to 30° C., and the reference power supply voltage may be set to 12V.

Figures 4A, 4B:
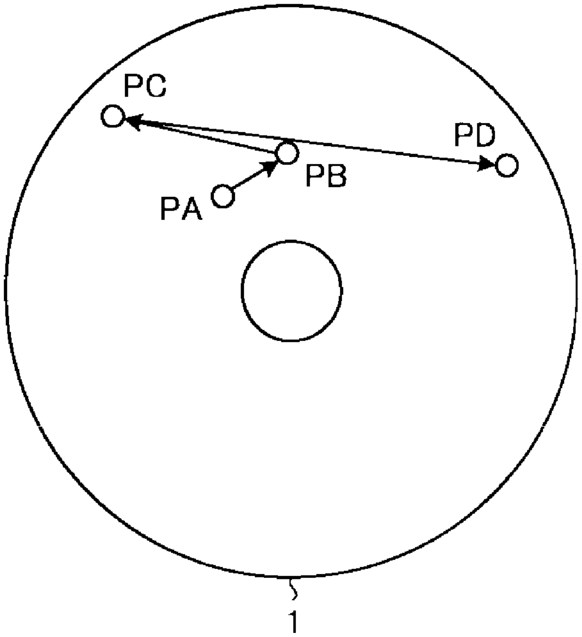
FIG. 4A is a view illustrating an example of a write command execution order of the magnetic disk device according to one embodiment.
FIG. 4B is a view illustrating an example of a seek path by the execution order of FIG. 4A.
Figures 4C, 4D:
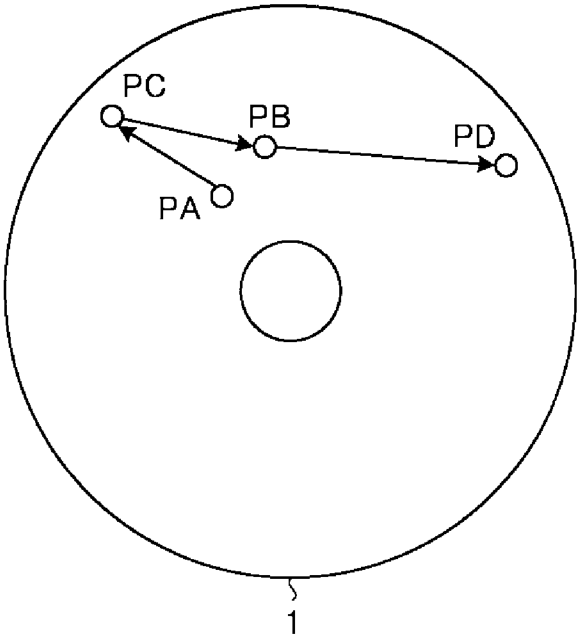
FIG. 4C is a view illustrating another example of the write command execution order of the magnetic disk device according to one embodiment.
FIG. 4D is a view illustrating an example of a seek path by the execution order of FIG. 4C.

FIG. 4A is a view illustrating an example of a write command execution order of the magnetic disk device according to one embodiment. FIG. 4B is a view illustrating an example of a seek path by the execution order of FIG. 4A. FIG. 4C is a view illustrating another example of the write command execution order of the magnetic disk device according to one embodiment. FIG. 4D is a view illustrating an example of a seek path by the execution order of FIG. 4C.

In FIG. 4A, it is assumed that write commands WA to WD are held in the queue Q. The write positions PA to PD are designated in the write commands WA to WD, respectively. It is here assumed that the write commands WA to WD are reordered so that a write position at which a latency of a write command to be executed next is minimized may be designated. The latency may be expressed by the sum of a seek time and a rotation latency. The rotation latency is a time required for rotation of the magnetic disk 1 until a target sector moves below the magnetic head 2 after the magnetic head 2 is sought.

In this case, as illustrated in FIG. 4B, the execution order of the write commands WA to WD may be set as an execution order of WA→WB→WC→WD. That is, assuming that the write position PA has the smallest latency from the current position of the magnetic head 2, the execution order of the write command WA is set to the first place. Assuming that the write position PB has the smallest latency when the magnetic head 2 is at the write position PA, the execution order of the write command WB is set to the second place. Assuming that the write position PC has the smallest latency when the magnetic head 2 is at the write position PB, the execution order of the write command WC is set to the third place. Assuming that the write position PD has the smallest latency when the magnetic head 2 is at the write position PC, the execution order of the write command WD is set to the fourth place.

By reordering the write commands WA to WD, it is possible to reduce the latency at the time of executing the write commands WA to WD, as compared with a case where the write commands WA to WD are sequentially executed from the oldest queuing side.

Meanwhile, in FIG. 4C, it is assumed that the write commands WA to WD are reordered so that a write position having the shortest total latency when all of the four write commands WA to WD are executed is designated. In this case, as illustrated in FIG. 4D, the execution order of the write commands WA to WD may be set to an execution order of WA→WC→WB→WD. In this method, even in a case where the write position PB has the shortest latency when the magnetic head 2 is at the write position PA, and the write position PC has the shortest latency when the magnetic head 2 is at the write position PB, the execution order of the write command WB is not set to the second place, and the execution order of the write command WC is not set to the third place. This is because it takes a time to seek to the writing position PD when the magnetic head 2 is at the writing position PC.

In this method, the four write commands WA to WD may be pre-fetched. Then, before reordering the write commands WA to WD, it is possible to recognize that it takes a time to seek to the writing position PD when the magnetic head 2 is at the writing position PC. Therefore, when the execution order of WC→WD is included so that the entire latency when all of the four write commands WA to WD is executed becomes long, an execution order of the write commands WA to WD which is different from that in FIG. 4B may be selected. Then, by setting the execution order of the write commands WA to WD to the execution order of WA→WC→WB→WD, in a case where the total latency when all of the four write commands WA to WD is executed is the shortest, that execution order may be selected.

In the execution order setting method of FIG. 4B, at the time of reordering, only a write position of the next write command is referred to. In contrast, in the execution order setting method of FIG. 4D, at the time of reordering, the write positions of the four write commands are referred to. Therefore, according to the execution order setting method of FIG. 4C, it is possible to reduce the latency taken for execution of all the write commands WA to WD, as compared to the execution order setting method of FIG. 4A. The seek time corrected based on the detection value DT of the temperature sensor 15 and the detection value DV of the voltage sensor 14 in FIG. 2 may be used to calculate the latency.

In addition, although the method of pre-fetching the four write commands has been illustrated in FIGS. 4C and 4D, the magnetic disk device according to the embodiment may pre-fetch K (K is an integer of two or more and N or less) write commands.

Figures 5A, 5B, 5C:
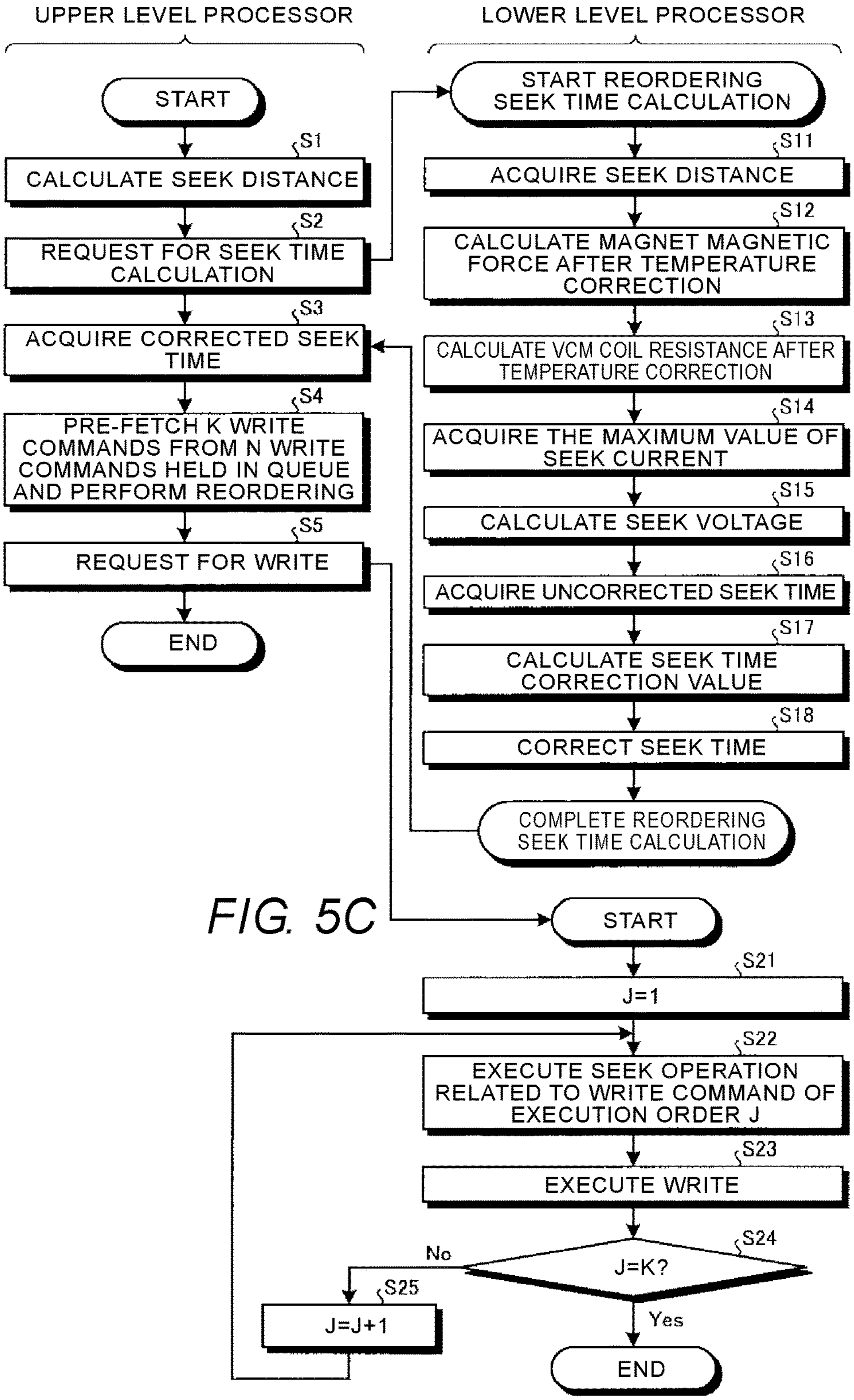
FIG. 5A is a flowchart illustrating a process of an upper level processor at the time of reordering of the magnetic disk device according to one embodiment.
FIG. 5B is a flowchart illustrating a process of a lower level processor at the time of reordering of the magnetic disk device according to one embodiment.
FIG. 5C is a flowchart illustrating a process of the lower level processor at the time of writing of the magnetic disk device according to one embodiment.

FIG. 5A is a flowchart illustrating a process of an upper level processor at the time of reordering of the magnetic disk device according to one embodiment. FIG. 5B is a flowchart illustrating a process of a lower level processor at the time of reordering of the magnetic disk device according to one embodiment. FIG. 5C is a flowchart illustrating a process of the lower level processor at the time of writing of the magnetic disk device according to one embodiment. The access control program 9A operates the CPU 8 as an upper level processor. The servo control program 9B operates the CPU 8 as a lower level processor. A case where the maximum current IH required for the seek operation is fixed at the maximum value of the seek current IS is illustrated in the flowchart of FIG. 5B. The following description will be given to the reordering method of FIG. 4D.

As illustrated in FIG. 5A, at the time of reordering, the upper level processor calculates a seek distance based on a write position designated by a write command and the current position (S1). In addition, in the execution order setting method of FIG. 4C, it is possible to calculate seek distances for all combinations between write commands held in the queue Q. For example, assuming that four write commands WA to WD are held in the queue Q, it is possible to calculate seek distances for a current position→each of WA to WD, WA→WB, WA→WC, WA→WD, WB→WC, WB→WD, and WC→WD.

Next, the upper level processor requests the lower level processor to calculate a seek time (S2). At this time, the seek distance is passed from the upper level processor to the lower level processor. Then, as illustrated in FIG. 5B, the lower level processor acquires the seek distance (S11).

Next, with reference to the detection value DT of the temperature sensor 15, the lower level processor calculates a temperature-corrected magnet magnetic force J1 according to the equation (1) (S12) and a temperature-corrected coil resistance R1 according to the equation (2) (S13). Next, the lower level processor acquires the maximum value of the seek current IS (S14) and calculates a voltage VS required for the seek operation according to the equation (3) (S15). Next, the lower level processor acquires an uncorrected seek time with reference to the seek table 9C (S16) and calculates a seek time correction value TH with reference to the power supply voltage VD2 according to the equation (4) (S17). Then, the lower level processor calculates a corrected seek time TSH according to the equation (5) (S18). At this time, the corrected seek time TSH is passed from the lower level processor to the upper level processor. Then, as illustrated in FIG. 5A, the upper level processor acquires the corrected seek time TSH (S3).

Next, the upper level processor pre-fetches K (K is an integer of two or more and N or less) write commands from the N (N is an integer of two or more) write commands held in the queue Q and performs a reordering process for the K write commands (S4). In this reordering process, it is possible to change the execution orders of write commands such that the latency at the time of executing all the K write commands is reduced, as compared with a case where the K write commands are sequentially executed from the oldest queuing side. At this time, it is possible to select an execution order in which the latency becomes the shortest, among the execution orders of the K write commands.

Next, the upper level processor makes a write request for the K write commands to the lower level processor (S5). The lower level processor sets an execution order J of a write command to 1 (S21). Next, the lower level processor executes the seek operation for the write command of the execution order J (S22) and executes data write at the seek destination (S23). The lower level processor determines whether or not J is equal to K (S24). When it is determined that J is not equal to K (No in S24), after incrementing J by 1 (S25), the process returns to S22. When it is determined that J is equal to K (Yes in S24), the write process is ended.

As described above, by correcting the seek time based on the detected temperature and the power supply voltage VD2 of the VCM drive circuit 12, it is possible to improve the robustness against variations of operation environments. Therefore, it is possible to draw the performance of the voice coil motor 4 to near a limit according to the operation environments, thereby making the write operation to be more efficient.

In addition, when the lower level processor executes the management of the power supply voltage VD2 and the detection value DT of the temperature sensor 15, and the upper level processor executes the reordering, it is possible to make the calculation of correction of the seek time to be more efficient.

Figure 6A:
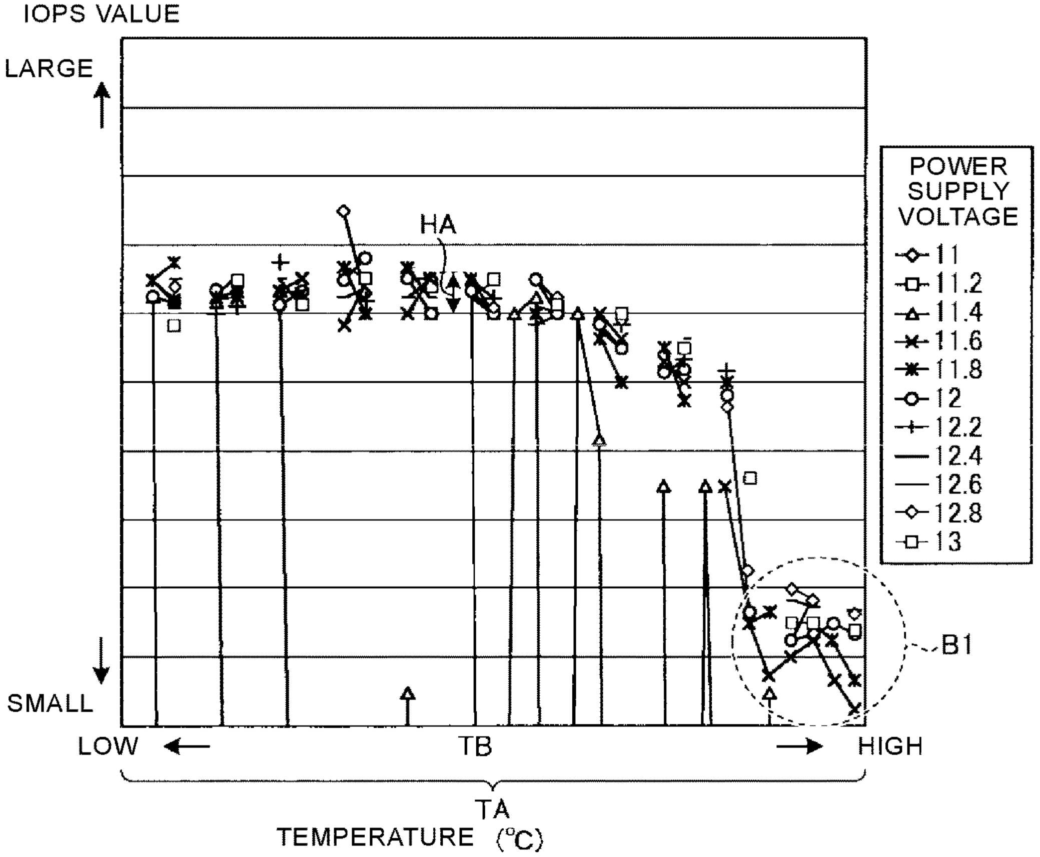
FIG. 6A is a view illustrating a relationship between a temperature and an IOPS value when reordering is performed using an uncorrected seek time in the magnetic disk device according to one embodiment.
Figure 6B:
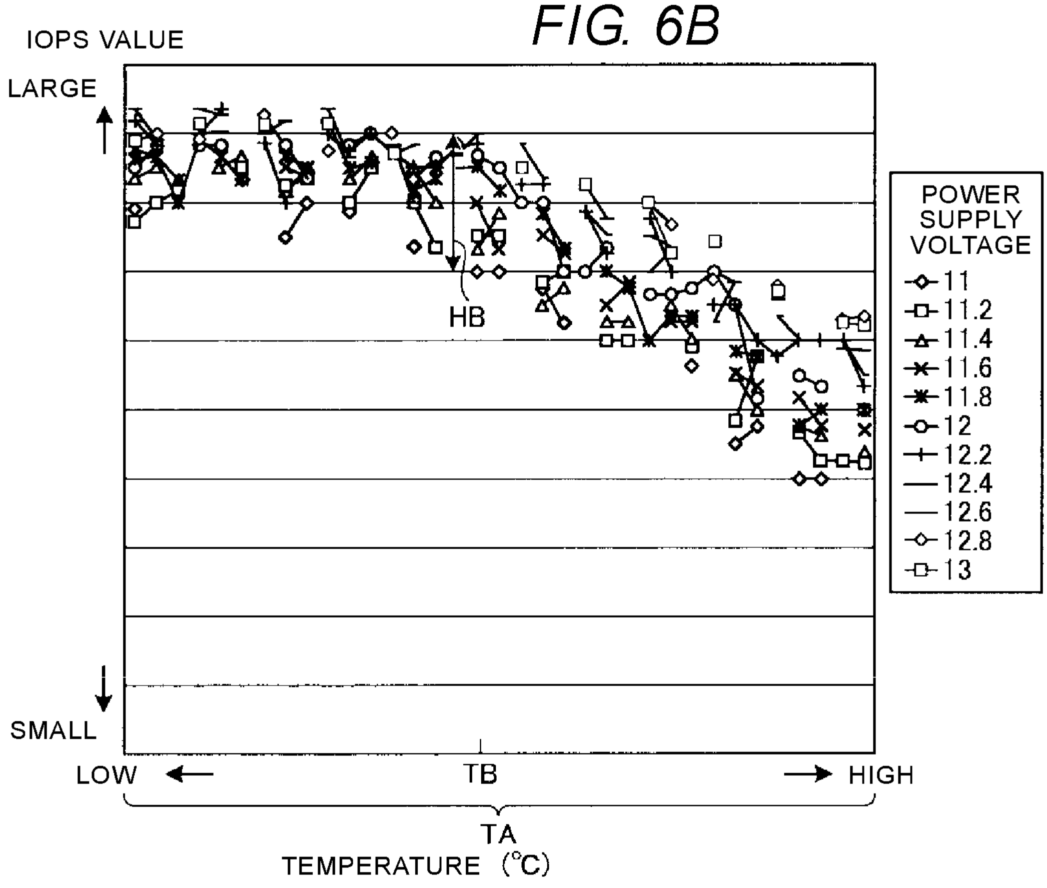
FIG. 6B is a view illustrating a relationship between a temperature and an IOPS value when reordering is performed using a corrected seek time in the magnetic disk device according to an embodiment.

FIG. 6A is a view illustrating a relationship between a temperature and an IOPS (input output per second) value when reordering is performed using an uncorrected seek time in the magnetic disk device according to one embodiment. FIG. 6B is a view illustrating a relationship between a temperature and an IOPS value when reordering is performed using a corrected seek time in the magnetic disk device according to one embodiment. An IOPS value is obtained by quantizing an I/O request from the host 20, which may be processed for one second by the magnetic disk device. In addition, FIG. 6B illustrates a case where the maximum current IH required for the seek operation is fixed at the maximum value of the seek current IS.

As illustrated in FIGS. 6A and 6B, the reordering which uses the corrected seek time (FIG. 6B) provides a larger IOPS value over the entire temperature range (TA), e.g., a range of −4° C. to 64° C., than the reordering which uses the uncorrected seek time (FIG. 6A). This is because using the uncorrected seek time takes a large margin so that the IOPS value does not change as much as possible even when a temperature changes, whereas using the corrected seek time may optimize the seek time in accordance with the change in temperature. However, the use of the corrected seek time provides a small margin and accordingly causes a greater variation of the IOPS value with respect to a variation of the power supply voltage VD2 than the use of the uncorrected seek time. For example, in FIG. 6A, at a temperature (TB) (e.g., 28° C.), a range of variation of the IOPS value with respect to the variation of the power supply voltage VD2 when the uncorrected seek time is used is HA. In contrast, in FIG. 6B, at the same temperature, a range of variation of the IOPS value with respect to the variation of the power supply voltage VD2 when the corrected seek time is used is HB. In addition, when the uncorrected seek time is used, there exists a temperature range (B1) (e.g., 52° C. to 64° C.) in which the IOPS value rapidly decreases. In contrast, when the corrected seek time is used, the IOPS value may be suppressed from being decreased rapidly even in the temperature range (B1).

Figure 7A:
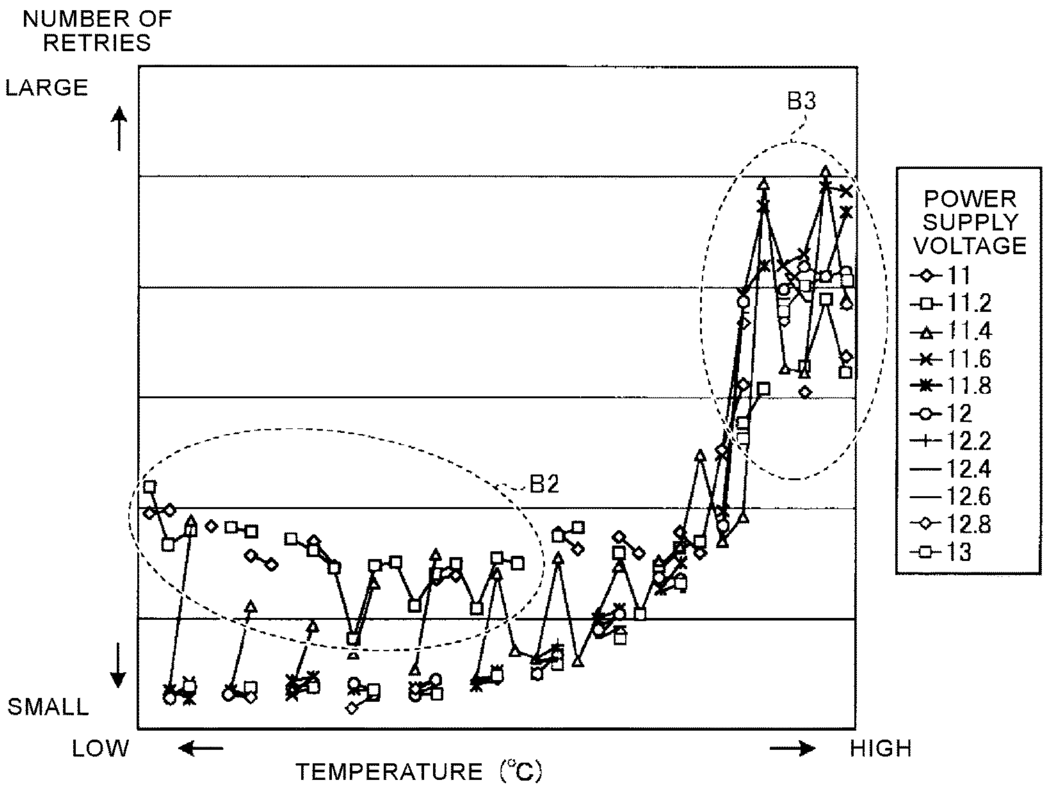
FIG. 7A is a view illustrating a relationship between a temperature and the number of retries when reordering is performed using an uncorrected seek time in the magnetic disk device according to an embodiment.
Figure 7B:
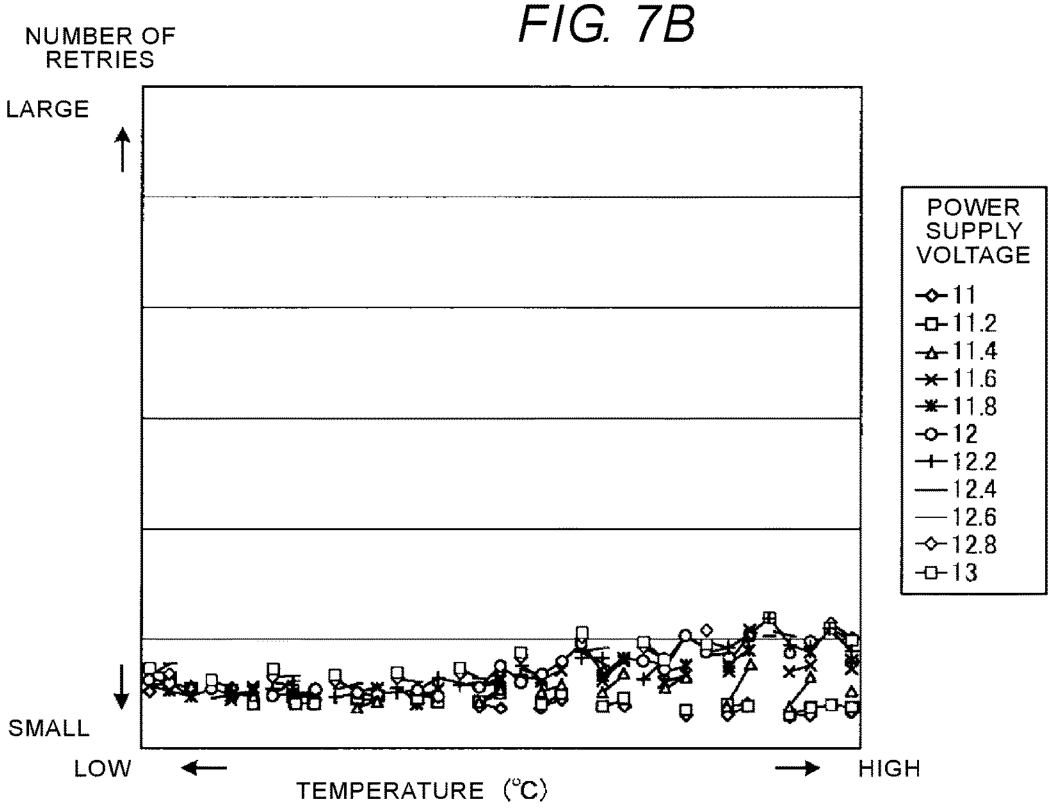
FIG. 7B is a view illustrating a relationship between a temperature and the number of retries when reordering is performed using a corrected seek time in the magnetic disk device according to one embodiment.

FIG. 7A is a view illustrating a relationship between a temperature and the number of retries when reordering is performed using the uncorrected seek time in the magnetic disk device according to one embodiment. FIG. 7B is a view illustrating a relationship between a temperature and the number of retries when reordering is performed using the corrected seek time in the magnetic disk device according to one embodiment. The number of retries corresponds to the number of revolutions of the magnetic disk 1 required for the seek operation to the target position. In addition, FIG. 7B illustrates a case where the maximum current IH required for the seek operation is fixed at the maximum value of the seek current IS.

In FIG. 7A, when the reordering is performed using the uncorrected seek time, in a relatively low temperature range (B2), the number of retries sharply increases when the power supply voltage VD2 is 11.4V or lower, as compared to when the power supply voltage VD2 is 11.6V or higher. When the reordering is performed using the uncorrected seek time, the number of retries sharply increases in a relatively high temperature range (B3).

In the meantime, in FIG. 7B, when the reordering is performed using the corrected seek time, the number of retries may be suppressed from being decreased sharply increasing over the overall temperature range in FIG. 7B. In addition, when the reordering is performed using the corrected seek time, the number of retries may be suppressed from being decreased sharply over the overall range of the power supply voltage VD2 from 11V to 13V.

Although, in the above-described embodiment, the reordering method at the time of writing has been described as an example, a reordering method at the time of reading may be similarly implemented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:

a magnetic disk;

a magnetic head;

a voice coil motor configured to drive movement of the magnetic head relative to the magnetic disk;

a drive circuit configured to drive the voice coil motor;

a memory in which a seek time for a seek operation is stored in association with a seek distance of the magnetic head; and a controller configured to change the seek time stored in the memory in association with the seek distance based on a temperature of the voice coil motor and a power supply voltage of the drive circuit, wherein the seek time is changed by correcting a magnet magnetic force and a coil resistance of the voice coil motor based on the temperature of the voice coil motor, and wherein the following relationships are satisfied:

$$J1=JK*(DT-TM)+J2;$$

$$R1=CK*(DT-TC)+R2;$$

$$VS=J1/J2*IH*(R1+RS+RN+RH)*VM; \text{ and}$$

$$TH=TS*(\mathrm{sqrt}(VS/VD2)-1), \text{ where}$$

the temperature of the voice coil motor is DT, a temperature-corrected magnet magnetic force of the voice coil motor is J1, a magnet reference magnetic force is J2, a magnet reference temperature is TM, a magnet temperature coefficient is JK, a temperature-corrected coil resistance of the voice coil motor is R1, a coil reference resistance is R2, a coil reference temperature is TC, a coil temperature coefficient is CK, a voltage required for the seek operation is VS, a maximum current required for the seek operation is IH, a resistance of a sense resistor which detects a seek current is RS, an on resistance of the drive circuit is RN, a resistance of a wiring from the drive circuit to the voice coil motor is RH, a voltage margin is VM, the power supply voltage of the drive circuit is VD, a seek time is TS, and a seek time correction value is TH.

2. The magnetic disk device according to claim 1, wherein the seek current used for the seek operation varies depending on the seek distance, and the maximum current required for the seek operation is equal to a maximum value of the seek current.

3. The magnetic disk device according to claim 1, further comprising:

a voltage sensor configured to detect the power supply voltage of the drive circuit;

a temperature sensor arranged to detect the temperature of the voice coil motor; and the sense resistor configured to detect the seek current which is supplied from the drive circuit to the voice coil motor.

4. The magnetic disk device according to claim 1, wherein the controller includes:

an upper level processor and a lower level processor; and a buffer which holds a queue corresponding to write commands, wherein the upper level processor is configured to calculate the seek distance based on the write commands, and wherein the lower level processor is configured to calculate the seek time correction value corresponding to the seek distance based on the temperature of the voice coil motor and the power supply voltage of the drive circuit.

5. The magnetic disk device according to claim 1, wherein an IOPS value at a reference temperature is larger after correction of the seek time than before correction of the seek time, and a variation of the IOPS value according to a variation of the power supply voltage of the drive circuit is larger after correction of the seek time than before correction of the seek time.

6. The magnetic disk device according to claim 1, wherein a variation of the number of retries according to a variation of the power supply voltage of the drive circuit is smaller after correction of the seek time than before correction of the seek time.

7. A magnetic disk device comprising:

a magnetic disk;

a magnetic head;

a voice coil motor configured to drive movement of the magnetic head relative to the magnetic disk;

a drive circuit configured to drive the voice coil motor;

a memory in which a seek time for a seek operation is stored in association with a seek distance of the magnetic head; and a controller configured to change the seek time stored in the memory in association with the seek distance based on a temperature of the voice coil motor and a power supply voltage of the drive circuit, the controller including an upper level processor and a lower level processor, and a buffer which holds a queue corresponding to write commands, wherein the upper level processor is configured to calculate the seek distance based on the write commands, wherein the lower level processor is configured to calculate a seek time correction value corresponding to the seek distance based on the temperature of the voice coil motor and the power supply voltage of the drive circuit, wherein the upper level processor causes the processor to execute reordering of the write commands held in the queue based on a seek time corrected according to the seek time correction value, and wherein the lower level processor causes the processor to execute a servo control at the time of data write in the magnetic disk based on a result of the reordering of the write commands.

8. The magnetic disk device according to claim 7, wherein, in the reordering, the upper level processor pre-fetches K (K is an integer of two or more and N or less) write commands from N (N is an integer of two or more) write commands held in the queue and changes execution orders of the write commands so that a total latency of executing the K write commands is reduced, as compared to a case where the K write commands are sequentially executed from the oldest queue side.

9. The magnetic disk device according to claim 8, wherein, in the reordering, the upper level processor selects an execution order of the write command in which the latency is the shortest, among the execution orders of the K write commands.

10. A command reordering method of a magnetic disk device including a magnetic disk, a magnetic head, a voice coil motor which drives movement of the magnetic head relative to the magnetic disk, and a drive circuit which drives the voice coil motor, the method comprising:

storing a seek time for a seek operation in association with a seek distance of the magnetic head; and changing the seek time stored in association with the seek distance based on a temperature of the voice coil motor and a power supply voltage of the drive circuit, wherein the seek time is changed by correcting a magnetic force and a coil resistance of the voice coil motor based on the temperature of the voice coil motor, and wherein the following relationships are satisfied:

$$J1=JK*(DT-TM)+J2;$$

$$R1=CK*(DT-TC)+R2;$$

$$VS=J1/J2*IH*(R1+RS+RN+RH)*VM; \text{ and}$$

$$TH=TS*(\text{sqrt}(VS/VD2)-1), \text{ where}$$

the temperature of the voice coil motor is DT, a temperature-corrected magnetic force of the voice coil motor is J1, a reference magnetic force is J2, a magnetic reference temperature is TM, a magnetic temperature coefficient is JK, a temperature-corrected coil resistance of the voice coil motor is R1, a coil reference resistance is R2, a coil reference temperature is TC, a coil temperature coefficient is CK, a voltage required for the seek operation is VS, the maximum current required for the seek operation is IH, a resistance of a sense resistor which detects a seek current is RS, an on resistance of the drive circuit is RN, a resistance of a wiring from the drive circuit to the voice coil motor is RH, a voltage margin is VM, the power supply voltage of the drive circuit is VD, a seek time is TS, and a seek time correction value is TH.

11. The command reordering method according to claim 10, wherein a seek current used for the seek operation varies depending on the seek distance and the maximum current required for the seek operation is equal to a maximum value of the seek current.

12. The command reordering method according to claim 10, further comprising:

calculating the seek distance based on a write command held in a queue; and calculating a seek time correction value corresponding to the seek distance based on the temperature of the voice coil motor and the power supply voltage of the drive circuit.

13. The command reordering method according to claim 12, further comprising:

executing reordering of the write commands held in the queue based on a seek time corrected according to the seek time correction value; and executing a servo control at the time of data write in the magnetic disk based on a result of the reordering of the write command.

14. The command reordering method according to claim 13, further comprising:

pre-fetching K (K is an integer of two or more and N or less) write commands from N (N is an integer of two or more) write commands held in the queue and selecting an execution order of the write commands in which a total latency is the shortest, among execution orders of the K write commands.

15. The command reordering method according to claim 10, wherein an IOPS value at a reference temperature is larger after correction of the seek time than before correction of the seek time, and a variation of the IOPS value according to a variation of the power supply voltage of the drive circuit is larger after correction of the seek time than before correction of the seek time.

16. The command reordering method according to claim 10, wherein a variation of the number of retries according to a variation of the power supply voltage of the drive circuit is smaller after correction of the seek time than before correction of the seek time.

* * * * *